(12) United States Patent
Sulek et al.

(10) Patent No.: US 8,900,021 B2
(45) Date of Patent: Dec. 2, 2014

(54) ELECTRICAL CONTACT TERMINAL WITH IMPROVED CONNECTION PORTION

(75) Inventors: Joerg Sulek, Altdorf (DE); Juergen Muehlmichel, Pottenstein (DE); Thomas Fili, Nuernberg (DE)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 146 days.

(21) Appl. No.: 13/640,510

(22) PCT Filed: Apr. 5, 2011

(86) PCT No.: PCT/EP2011/055245
§ 371 (c)(1),
(2), (4) Date: Nov. 2, 2012

(87) PCT Pub. No.: WO2011/128225
PCT Pub. Date: Oct. 20, 2011

(65) Prior Publication Data
US 2013/0059487 A1 Mar. 7, 2013

(30) Foreign Application Priority Data
Apr. 12, 2010 (WO) .................. PCT/IB2010/001279

(51) Int. Cl.
| | |
|---|---|
| *H01R 13/02* | (2006.01) |
| *H01R 4/18* | (2006.01) |
| *B23K 1/00* | (2006.01) |
| *H01R 13/03* | (2006.01) |
| *H01R 4/62* | (2006.01) |
| *H01R 13/11* | (2006.01) |

(52) U.S. Cl.
CPC .............. *H01R 4/187* (2013.01); *B23K 1/0008* (2013.01); *H01R 13/03* (2013.01); *B23K 2201/38* (2013.01); *H01R 4/185* (2013.01); *H01R 4/62* (2013.01); *H01R 13/111* (2013.01)
USPC .......................................................... 439/884

(58) Field of Classification Search
CPC ....... H01R 4/187; H01R 13/03; B23K 1/0008
USPC .......................... 439/874, 875, 877, 884–887
See application file for complete search history.

(56) References Cited

U.S. PATENT DOCUMENTS

| | | | |
|---|---|---|---|
| 5,381,944 A | 1/1995 | Makowiecki et al. | ..... 228/124.5 |
| 2007/0224441 A1 | 9/2007 | Bunyan | .......................... 428/615 |
| 2008/0314735 A1 | 12/2008 | Weihs et al. | ................ 204/192.1 |
| 2010/0038409 A1 | 2/2010 | Wilden et al. | .................. 228/121 |

FOREIGN PATENT DOCUMENTS

| | | |
|---|---|---|
| DE | 197 27 314 A1 | 1/1999 |
| EP | 1 730 813 B1 | 5/2007 |
| WO | WO2005/055371 A1 | 6/2005 |

*Primary Examiner* — Khiem Nguyen
(74) *Attorney, Agent, or Firm* — Robert J. Myers

(57) ABSTRACT

The present invention relates to an electrical contact terminal adapted to be mounted to an electrical cable including at least one connection portion adapted for mounting the electrical cable and at least one contact portion. The connection portion is provided with at least one reactive film including at least two materials in a reactive form. This film is adapted to react after reception of a suited activation energy thereby producing heat and thus causing a bonding between the connection portion and a cable.

21 Claims, 2 Drawing Sheets

ELECTRICAL CONTACT TERMINAL WITH IMPROVED CONNECTION PORTION

1. FIELD OF THE INVENTION

Figure 1:
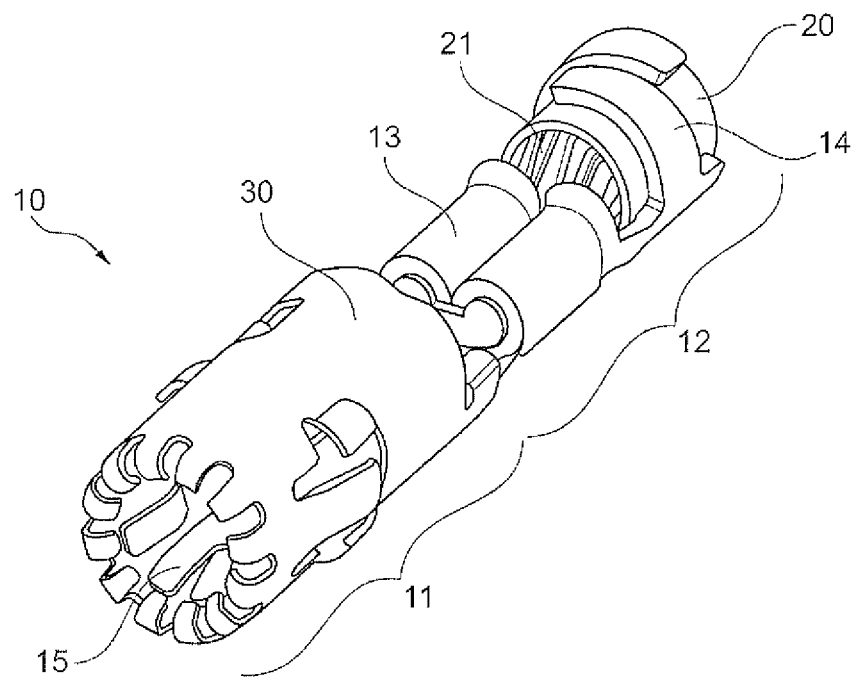

The present invention relates to an improved electrical connection, e.g. of an electrical contact terminal to an electrical cable.

2. TECHNICAL BACKGROUND

The use of contact terminals as connection means for cable ends is well known in the art. Commonly, cables are fixed to contact terminals by crimping a stripped cable strands to a connection portion of the contact terminal. However, many applications demand for more reliable electrical contact and/or reduced contact resistance between cable and terminal. This is particularly important in the case where cables and contact terminals of different material have to be connected. Here, due to different physical properties of the members, connections that first appear to be reliable may deteriorate with time.

A typical example for the latter case is the use of aluminum cables together with copper contact terminals. The terms aluminum and copper as used herein, denote the commonly used forms of these materials as cable or terminal material, including e.g. also aluminum and copper alloys, which are alloys having a fraction of at least 50% of aluminum or copper, respectively. The use of aluminum cables for example in automotive applications gains more and more interest since aluminum is lighter and less expensive as compared to the commonly used copper. Although an aluminum cable needs to be of larger cross section (about a factor of 1.6) to transmit the same current as a copper cable, still, by replacing the copper cable with an aluminum cable, a significant weight reduction (e.g. 10-20 kg per car) can be achieved. Thus, aluminum is very attractive for the use as wire material; however, the use of aluminum cables poses new problems which do not occur in the case of using copper cables.

Since still a large number of electrical components as e.g. contact terminals have to be made from copper, aluminum cables have to be connected to copper contact terminals. If e.g. an aluminum cable is crimped to a copper contact terminal, the crimped aluminum cable end tends to "flow", i.e. the connection can become loose. Further, aluminum tends to corrode forming a layer of aluminum oxide which has poor electrical conductivity. This is in particular a problem if aluminum and another metal are in contact and an electrolyte (e.g. moisture) is present in between the contact faces. In this case, the two different metals facilitate corrosion. It reduces the reliability and the durability of e.g. a crimp connection between an aluminum cable and a copper contact terminal significantly.

Thus, connecting aluminum cables to other electrical means, such as e.g. contact terminals, demands for new solutions, in particular if said electrical means are made from a different material.

A document dealing with this problem is DE 197 27 314 A1, which discloses a method to secure the crimping of cables to copper contact terminals by applying a conductive glue to the crimping zone. The glue serves to reduce the contact corrosion of the two members to be crimped. However, the use of glue is not always possible and/or satisfying.

A further method to secure a crimp connection between an aluminum cable and e.g. a contact terminal is described in EP 1 817 819 B1. In this document, it is suggested to insert a contacting material, e.g. tin or a tin alloy, between the crimping portion of the contact terminal and the aluminum cable. Said contacting material is heated up by means of a flame or a laser until it melts. Then, upon solidification, it forms a material connection between the cable and the contact terminal. During the heating or after, the contact terminal and the cable are crimped together.

Document EP 1 730 813 B1 discloses yet another method to improve the connection of a copper contact terminal to an aluminum cable. This document suggests establishing a permanent connection between the two members by means of plasma welding. To establish the electrical connection the contact terminal is coated with nickel while the cable is coated with zinc and the two coatings are mutually connected by plasma welding. However, this technique is rather complex because it involves a plasma welding process which is not easy to implement in particular on large connection areas.

An aim of the invention is to provide an electrical contact terminal which comprises an improved connection portion for the mounting of an electrical cable. The term "cable" as used herein is to be understood in its broadest meaning and denotes any kind of conductor commonly attached to contact terminals, as e.g. wires (coated and uncoated), strands, leads, cable sheathing, etc. It is a further object to the present invention to provide a new method of manufacturing said contact terminal.

3. SUMMARY OF THE INVENTION

According to the invention a new electrical contact terminal is provided which comprises at least one connection portion which is adapted to mount an electrical cable and at least one contact portion. The cable may be e.g. a cable or wire, strand, lead, etc, and/or it may further be coated by tin or a similar material. The contact portion is adapted to be connected e.g. to a corresponding counter contact terminal e.g. within a connector assembly. The connection portion is provided with means for cable connection and further comprises at least one reactive film comprising at least two materials in a reactive form. Here it is emphasized, that the term "in reactive form" identifies the main difference to prior art contact improvements as e.g. the inclusion of glue or solder materials. This term means that the two materials are provided in a form inherently containing energy, which after a suited activation can be set free producing enough heat to melt the film or also the surfaces of the members in contact with this film. Upon reaction of the materials a bond between terminal and cable is established. This bond may either be a bond similar to a soldering bond where only the film melts, thereby providing a braze material to connect cable and the terminal, or also be similar to a welding bond, where the produced heat is enough, to meld the surfaces of cable and terminal or a mixture of both.

The two materials can be e.g. chemicals which can together undergo an exothermic chemical reaction or an explosion, thereby providing heat and bonding the connection portion to a mounted cable. However, preferably the two materials are provided in form of a reactive arrangement of very thin metal-based layers, taken from the groups of metals, metalloids or half metals. This reactive arrangement of the two metals may be achieved by a "nanoreactive" arrangement, i.e. an arrangement of layers of two different metallic materials where due to the thinness of the layers (in the order of tens of nanometers) the film may react producing heat.

A similar technology using alternating nano layers was used in the remote field of joining electronic elements as e.g. integrated circuits. The U.S. Pat. No. 5,381,944 describes a joining technique for silicon wavers and similar involving thin multilayered films which upon reaction function as a braze material between two surfaces of members which are to be bonded.

According to this document the technique is ideally suited for the field of bonding silicon wavers and integrated circuits because the involved temperatures are relatively low. The document discloses the use of this method especially for joining temperature sensitive materials as they are used e.g. in the field of microelectronics, because the process is essentially a room temperature brazing process. Applicants surprisingly found that, if appropriately adapted, this technique can also be used to successfully improve e.g. a crimp connection between e.g. a contact terminal and a cable. With this technique, a strong mechanical connection between elements to be bonded can be achieved, even if these elements are from different materials. If appropriately adapted, a similar "nanoreactive" film can be used to establish a material bond between the terminal and the cable. The bond can be either similar to a soldering bond, when the film upon reaction provides just enough heat to melt. Here, the film can be used as a braze material connecting the cable to the terminal. Furthermore, the film can be used in a form where it provides enough heat to also partially melt the cable and terminal surfaces, where upon reaction it connects the two members similar as with a welding connection.

In a preferred embodiment the connection portion comprises at least one crimping element to crimp the connection portion to the inserted cable. Preferably, during or after crimping the connection portion to the inserted cable, the reactive film is activated. The activation can be for example by applying pressure, applying a temperature, applying an electrical voltage or using optical means. Optical means can be shining light of suited power and wavelength onto the reactive film preferably using a laser. The activation causes the film to react preferably producing heat and establishing a physical bond between the connection portion and the inserted cable.

In a preferred embodiment, the reactive film is deposited on the connection portion by means of Physical Vapor Deposition (PVD). In a different embodiment the reactive film is provided as a separate sheet arranged on the connection portion. In other words, the film itself may be a separate sheet, or the film may be a film applied to a carrier structure. In a preferred embodiment the reactive film (respectively the separate reactive sheet) has an average thickness of 10 μm-200 μm preferably of 25 μm-100 μm, most preferably of 30 μm-60 μm.

In a preferred embodiment at least one of the reactive films comprises a plurality of alternating layers, each layer comprising at least one of the two materials in a reactive form. It is important to note, that in the example case of the above mentioned "nanoreactive" form, the layers have to be thin. Thereby, thin means, that they have to be thin enough to be "nanoreactive", however, they still have to be thick enough, to produce enough heat upon reaction. Suitable and preferred layers have an average thickness of 1 nm-200 nm, preferably of 10 nm-100 nm, most preferably of 25 nm-75 nm.

In a preferred embodiment the electrical contact terminal further or alternatively comprises at least one reactive film comprising an agglomerate of the two materials in a reactive form. This agglomerate may be the result of a deposition of both materials together so that a mixture of clusters is formed. This cluster formation may be not fully completed so that the reactive film additionally comprises a "background" or "matrix" of the two materials in non-clustered form. Preferably, the clusters have an average diameter of 1 nm-200 nm, preferably of 10 nm-100 nm, most preferably of 25 nm-75 nm In a preferred embodiment the reactive film comprises further at least one layer of fusible material which preferably melts due to the heat produced by the reaction of the reactive film, thereby establishing a braze joint between the inserted cable and the connection portion.

In a preferred embodiment, one of the reactive materials is chosen from the group of transition metals, preferably titanium, zirconium, hafnium, niobium, tantalum, while the other material is chosen from the group of metalloids, preferably boron, carbon, or silicon.

In a preferred embodiment the electrical contact terminal is made from sheet of metal (not necessarily a sheet metal). Preferably, the contact terminal is provided in an assembly comprising the electrical contact terminal and a cable. The cable is preferably an aluminum cable, i.e. a cable made of aluminum or an aluminum alloy with a substantial Al-content of at least 50%.

The invention also relates to a method of assembly an electrical contact terminal and at least one cable. The at least one cable is arranged on the connection portion of the contact terminal and suited activation energy is provided to the reactive film. Thereby, the reactive film is activated producing heat and thus creates a bond between the connection portion and the cable. The result is an improved electrical and physical connection of the cable with the connection portion. This connection can advantageously sustain larger extraction forces, in particular due to mechanical stress or heat, as it would be possible without the use of a reactive film.

Further the invention relates to an assembly manufactured by the above described method.

Further according to the invention a method of manufacturing the electrical contact terminal is provided. In a first stage, the forms of the electrical contact terminal are stamped e.g. into a band of sheet of metal. This band is then subject to bending stages, where the necessary bending steps are performed until the desired shape is reached. Hereby, every bending step may require a number of pre-bending actions. According to the invention, the reactive film is provided before or after stamping, to the portion of the metal band which results in the connection portion after the full manufacturing process.

In a preferred embodiment, the film is deposited in form of alternating layers, where each layer contains one of the two materials. This deposition is performed by guiding the sheet of metal or the terminals in a pre-bent form through a chain of deposition units in which the alternating layers are deposited one after the other, or the sheet is moved back and forth between suited deposition units.

In a different embodiment, the film is deposited so as to form an agglomerate of clusters, each cluster mainly containing one of the two materials. Here, it is important to note, that the process of clustering may be non-complete and a fraction of the film contains one of the materials or a mixture of the two in non-clustered form. It is also important to note, that in both of the latter described embodiments, in which the film is given in form of layers or in form of clusters, the process of material deposition may not be perfect and the materials can be deposited containing a small fraction of polluting material.

4. DESCRIPTION OF THE PREFERRED EMBODIMENT

Figure 2:
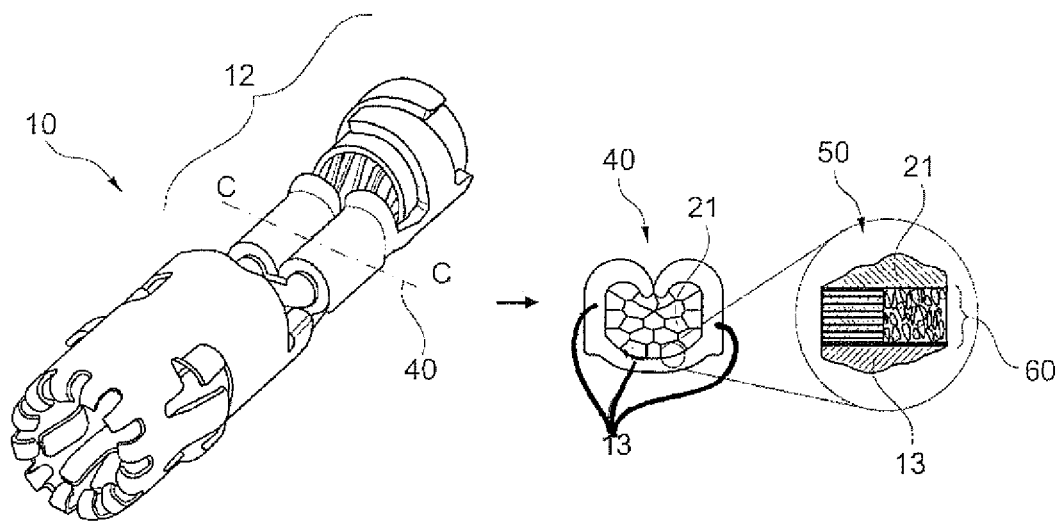
Figure 3A:
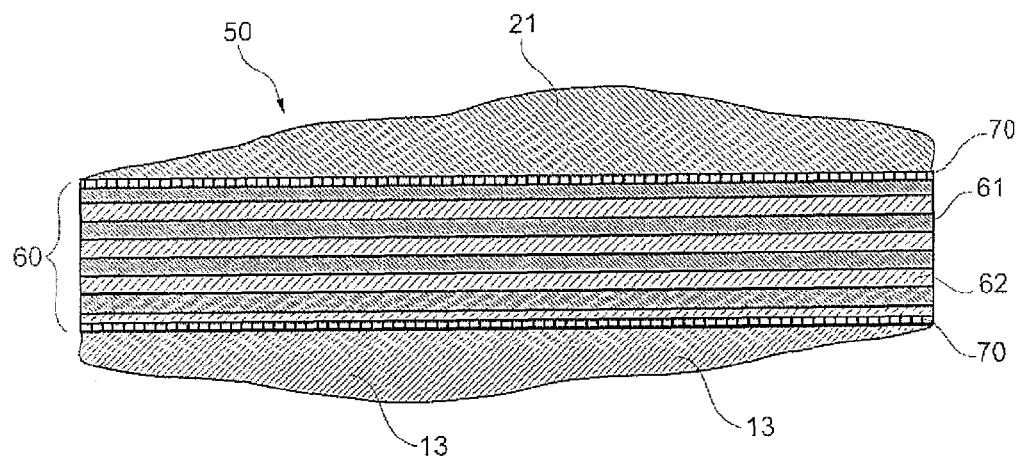
Figure 3B:
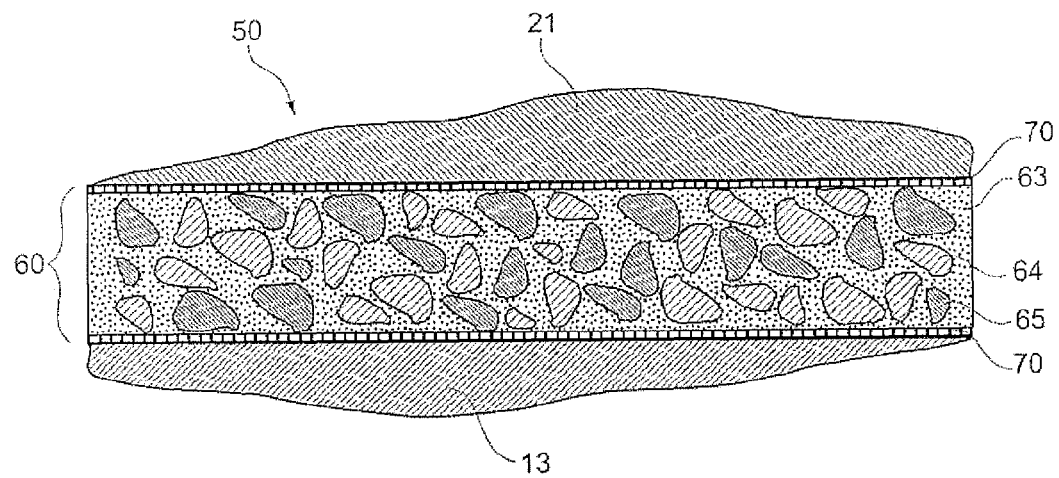

In the following the invention is described exemplarily with reference to the enclosed figures, in which:

FIG. 1 shows a contact terminal 10 crimped to a cable 20;

FIG. 2 shows a cross section through the connection portion 12 of the contact terminal 10, with a detail of the interface 50 between cable strands 21 and the crimping wings 13 of the contact terminal 10; and FIGS. 3A and 3B are schematic illustrations of exemplary reactive films.

FIG. 1 shows a female contact terminal 10. The contact terminal 10 comprises a contact portion 11 adapted to receive a corresponding pin of a male contact terminal. The contact terminal 10 further comprises a connection portion 12, comprising crimping means in form of crimping wings 13 and crimping arms 14. Via these crimping means the contact terminal 10 is connected to a cable 20, whereby the crimping arms 14 encircle the cable sheath and the crimping wings 13 are connected to the cable strands 21. A spring element 30 is shown mounted on the contact portion 11, the function of which is well known to the person skilled in the art and is not relevant for the invention. Through the opening of the spring element 30 (seen on the left hand side of the figure) contact spring arms 15 of the contact terminal 10 are visible, these contact spring arms 15 being adapted to establish an electrical contact between the contact terminal 10 and the pin of the male contact terminal when in mated condition.

The above described contact terminal 10 is also shown on the left hand side of FIG. 2. The central part of FIG. 2 shows a cross section 40 cut along a line (C-C) through the connection portion 12 of the contact terminal 10. The cross section 40 shows the crimping wings 13, which are crimped around the cable strands 21. The right hand part of the figure is a more detailed view into the interfacial region between the cable strands 21 and the crimping wings 13. In this more detailed view one can see a schematic illustration of two examples of reactive films 60 as they are before reaction. The reactive film 60 may completely cover the interface between cable strands 21 and crimping wings 13 but it may also cover only fractions of this interface. The reactive films are illustrated in more detail in FIGS. 3A and 3B. The reactive film 60 has for example the same kind of structure as the multilayer described in U.S. Pat. No. 5,381,944.

In the figures, the reactive film 60 is only shown schematically in a pre-reacted form. In reality after being deposited or inserted in between the crimping wings 13 and the cable strands 21, the film should be activated or ignited so that it reacts and produces heat. Thereby it melts forming a soldered connection between the cable strands 21 and the crimping wings 13 of the connection portion 12. It may also produce enough heat to partially melt the surfaces of cable strands 21 and crimping wings 13, thereby establishing a material connection similar to a welding connection. The ignition of the film could be performed before, during or after the process of crimping the crimping wings 13 around the cable strands 21. This ignition could be performed for example using a laser, applying heat, or using an electrical voltage. The ignition could for example also be caused by applying pressure, for example by the crimping process itself. In summary, the result of the reaction of the reactive film 60 will be a material bond between the cable strands 21 and the crimping wings 13. The initial form of the reactive film, for example the "nanoreactive" layer or cluster structure, may not be detectable after the film is reacted. It may appear similar to a soldering or welding connection.

FIGS. 3A and 3B show the interface 50 in more detail. FIG. 3A shows a possible embodiment of the reactive film 60 between the strands 21 of the cable 20 and the crimping portion 13, the cable strands 21 and the crimping portion 13 only indicated. In the shown embodiment the reactive film comprises alternating layers 61 and 62. Each layer is essentially made up from a different material in a reactive form. In the figure, these layers have a sharp boundary, which of course in reality may be difficult to achieve. In reality the boundary between layers will comprise a certain mixture, which could be analyzed with e.g. X-ray or electron diffraction, interferometric methods or different methods of analysis. In an extreme situation the layers may be even understood in the sense of a possible wavelike variation of density of the two materials, where the wave maxima essentially alternate. The number of layers given by the figure is only given as an example for illustrative purpose. In real implementations the actual number of layers may be larger e.g. in the range of a few tens of layers. The average thickness of the layers is in the range of 1 nm-200 nm, more preferably in the range of 10 nm-100 nm, most preferably in the range of 25 nm-75 nm. The figure may cause the wrong impression that all the layers have exactly the same thickness. This is in reality not necessary. Additionally due to imperfections in the production process the layers further may be contaminated with a fraction of either the other material or at least one different polluting material. The fraction of this polluting material compared to the intended material (the material which is supposed to be in the layer) per layer should be less than 1%, preferably less than 0.8%, most preferably less than 0.5%. The figure shows additionally two films of fusible material 70 which are explained in connection with FIG. 3B.

FIG. 3B shows a different embodiment of the reactive film 60. Similar to FIG. 3A, the cable strands 21 and the crimping portion 13 are only indicated. In this embodiment the reactive film is formed of an agglomerate of clusters 64 and 65 and an optional "background" or matrix material 63. Each cluster comprises essentially one of the at least two materials in a reactive form. It is important to note that due to imperfections in the production process the clusters may be contaminated similarly to the above described case with a fraction of either the other material or at least one different polluting material. Also in this case, the fraction of this polluting material compared to the intended material (the material which is supposed to be in the cluster) per cluster should be less than 1%, preferably less than 0.8%, most preferably less than 0.5%.

The clusters have an average diameter of 1 nm-200 nm, preferably of 10 nm-100 nm, most preferably of 25 nm-75 nm. Similar to the case described above, due to fabrication imperfections, also the clusters will not all have exactly the same diameter. Further, similar to the case described in. In the real implementation the clusters may have also a more dilute boundary zone in which the density of the intended material decreases not so abruptly. The "background" or matrix material 63 may be either one of the two materials or a mixture of the two materials in a non-clustered form. The fraction [in atomic %] of the matrix material in the overall reactive film is preferably less than 50%, more preferably less than 30%, even more preferably less than 20% and most preferably less than 10%. A fraction of 20% means e.g. that based on 100 atoms, 20 atoms would be in non-clustered form and the other 80 atoms in clustered form.

Similar to the case illustrated in FIG. 3A, the figure further contains two layers of fusible material 70. This material is intended to melt upon the reaction of the reactive film, thereby establishing the inventive bonding of the cable strands 21 to the crimping wings 13 similar to a solder connection (the fusible material can be used as only bonding means or in addition to the bonding achieved by the reactive film itself). The fusible material may be e.g. tin or aluminum.

The invention claimed is:

1. An electrical contact terminal adapted to be mounted on an electrical cable comprising:

at least one connection portion adapted for mounting the electrical cable and at least one contact portion, wherein the connection portion is provided with at least one reactive film comprising at least two materials in a reactive form, this film being adapted to react after reception of a suited activation energy thereby producing heat and thus causing a bonding between the connection portion and a cable.

2. The electrical contact terminal according to claim 1, wherein the connection portion comprises at least one crimping means adapted to crimp a cable.

3. The electrical contact terminal according to claim 1, wherein the at least one reactive film can be activated by applying pressure, heat, electrical current, optical means or a combination thereof.

4. The electrical contact terminal according to claim 1, wherein the at least one reactive film is deposited on the connection portion by means of physical vapor deposition (PVD).

5. The electrical contact terminal according to claim 1, wherein the at least one reactive film is arranged on the connection portion in form of a separate sheet.

6. The electrical contact terminal according to claim 1, wherein the at least one reactive film comprises an average thickness of 10 µm-200 µm.

7. The electrical contact terminal according to claim 1, wherein the at least one reactive film comprises a plurality of alternating layers, each layer comprising at least one of the said materials or the at least one reactive film comprises said materials in form of an agglomerate.

8. The electrical contact terminal according to claim 1, wherein the at least one reactive film comprises a plurality of alternating layers, each layer comprising at least one of the said materials, each layer having an average thickness of preferably 1 nm-200 nm, or wherein the at least one reactive film comprises said materials which are essentially arranged in form of an agglomerate of clusters, said clusters having an average diameter of 1 nm-200 nm.

9. The electrical contact terminal according to claim 1, wherein the at least one reactive film further comprises at least one layer of fusible material.

10. The electrical contact terminal according to claim 1, wherein one of the two materials is chosen from the group of transition metals while the other of the two materials is chosen from the group of metalloids.

11. The electrical contact terminal according to claim 1, wherein one of the two materials is chosen from the group consisting of titanium, zirconium, hafnium, niobium, tantalum, aluminum while the other of the two materials is chosen from the group consisting of boron, carbon, silicon, nickel.

12. The electrical contact terminal according to claim 1, wherein the electrical contact terminal is made of sheet metal.

13. The electrical contact terminal according to claim 1, wherein the connection between the cable and the connection portion sustains an extraction force which is greater by a factor of at least 10%, as compared to a corresponding standard crimping connection without the bonding.

14. The electrical contact terminal according to claim 1, wherein the two materials of the at least one reactive film are aluminum and nickel.

15. An assembly comprising an electrical contact terminal and at least one electrical cable manufactured by providing an electrical contact terminal according to claim 1, by arranging the at least one cable on the connection portion and by providing a suited activation energy to the at least one reactive film, thereby causing the activation and reaction of said film producing heat and thus causing a bonding between the connection portion and the cable.

16. A method for manufacturing an electrical contact terminal according to claim 1, comprising the following steps:
    a) providing a sheet metal for production of the electrical contact terminal;
    b) stamping the form into the sheet metal as needed to produce the electrical contact terminal, while a guiding portion of the metal band is left unchanged to serve for continuation and guidance of the parts during production; and
    c) performing necessary bending steps until the desired shape is reached; hereinafter step a) the electrical contact terminal is provided with at least one reactive film comprising at least two materials in a reactive form, this film being adapted to react after reception of a sufficient activation energy thereby producing heat and thus causing a bonding between the connection portion and an inserted cable.

17. The method according to claim 16, wherein at least one of the reactive films is provided after step b) to the connection portion.

18. The method according to claim 16, wherein at least one of the reactive films is deposited after step b) onto the connection portion by means of PVD.

19. The method according to claim 16, wherein at least one of the reactive films is provided after step a) to the part of the sheet metal which is adapted to form the connection portion.

20. The method according to claim 16, wherein at least one of the reactive films is deposited after step a) to the part of the sheet metal which is adapted to form the connection portion by means of PVD.

21. A method for assembling a cable to an electrical contact terminal, comprising the following steps:
    a) providing a contact terminal according to claim 1;
    b) arranging an electrical cable on the connection portion of the contact terminal; and
    c) providing suited activation energy to the reactive film, causing the film to react producing heat and thereby establishing a bond between the connection portion and the cable.

* * * * *